July 18, 1944.   I. C. McKECHNIE   2,353,840
POWER TRANSMISSION
Filed Nov. 12, 1940   4 Sheets-Sheet 1

INVENTOR
Ian C. McKechnie.
BY
Harness, Dickey, Pierce & Harris
ATTORNEYS.

July 18, 1944.  I. C. McKECHNIE  2,353,840

POWER TRANSMISSION

Filed Nov. 12, 1940  4 Sheets-Sheet 4

INVENTOR
Ian C. McKechnie.
BY
ATTORNEYS.

Patented July 18, 1944

2,353,840

UNITED STATES PATENT OFFICE 2,353,840

POWER TRANSMISSION

Ian C. McKechnie, Detroit, Mich., assignor to Chrysler Corporation, Highland Park, Mich., a corporation of Delaware Application November 12, 1940, Serial No. 365,223

26 Claims. (Cl. 74—472)

This invention relates to motor vehicles and refers more particularly to power transmission and control mechanism therefor.

In transmissions of the automatic or semi-automatic types, there is a tendency for the change speed mechanism to fail to operate properly after the transmission has been left standing in a cold atmosphere. Under such conditions the lubricants, to which the various parts are subjected, become "sticky" and the parts tend to become sluggish in action if indeed they operate at all. Also, very low temperatures affect the various clearances between fits, connections, bearings, etc., throughout the mechanism and this results also in failure or improper operation of the transmission control.

In certain types of transmissions, such as disclosed for example in the copending application of Carl A. Neracher, et al., Serial No. 335,310, filed May 15, 1940, failure of the automatically operating change speed control element to operate as intended may result in an undesired no-back or lock-up condition in the transmission; also in undesired and prolonged operation of the torque-relieving device which may comprise means for rendering the engine ignition system inoperative as by grounding the same. In addition such types of transmissions give rise to improper car starting speed ratios when the automatic speed ratio controlling mechanism fails to function properly. These troubles or failures are aggravated during very cold winter weather when the temperature falls below 10° or 15° Fahrenheit. Especially are these troubles and failures experienced at temperatures below zero. Of course, after the car has been driving for awhile then the heat from the engine and friction heat throughout the mechanism raises the temperature of the parts so that they will function normally even though the atmosphere continues to remain at the very low temperatures mentioned.

It is an object of my invention to provide means automatically responsive to temperature conditions for so controlling the transmission mechanism that it will not give rise to troublesome and objectionable performance.

Another object is to provide thermal-responsive means which will overrule or modify the action of the normal control mechanism at times when the normal control tends to operate improperly, automatically restoring the transmission to normal control at other times.

A further object is to provide thermal-responsive means for preventing operation of the torque-relieving means, such as ignition interruption, at times when the latter means tends to function improperly.

Another object is to provide thermal-responsive means for automatically controlling operation of one or more of the transmission speed ratio drives.

Another object is to provide improved means for guarding against the possibility of the transmission mechanism becoming locked-up or providing an undesired no-back condition.

Another object is to provide thermal-responsive means for automatically controlling operation of one or more transmission speed ratio drives without thereby affecting operation of one or more additional drives. In connection with this object, in one embodiment thereof, the driver may manually invoke one or more transmission drives while other drives of an automatic nature are under control of the thermal-responsive means.

Another object is to provide a simple and effective means for guarding against the possibility of the transmission mechanism functioning to ground out the engine ignition system longer than a desired predetermined time.

Further objects and advantages of my invention will be more apparent from the following illustrative embodiment thereof, reference being had to the accompanying drawings in which.

While my control may be employed in conjunction with various types and arrangements of motor vehicle transmissions, in order to illustrate one driving system, I have shown my invention in connection with certain salient parts of the aforesaid Neracher et al. application.

In the drawings, A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Figure 3:
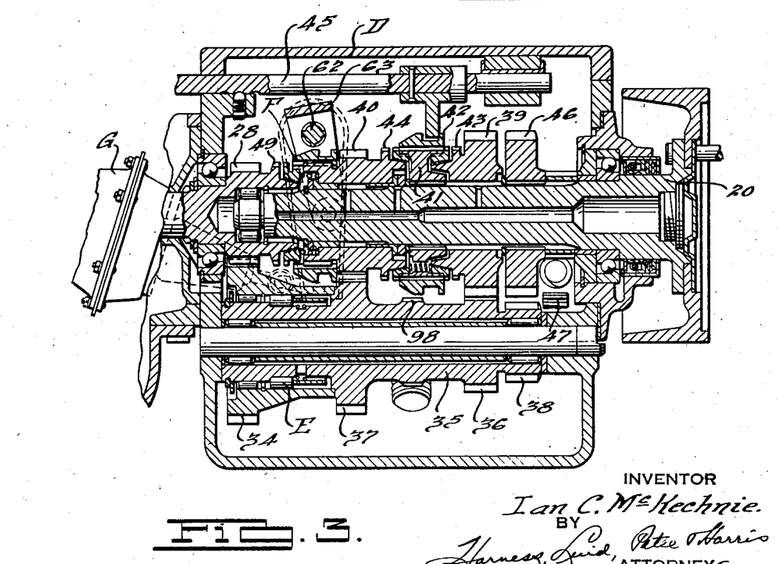
Fig. 3 is a similar view through the change speed transmission.
Figure 4:
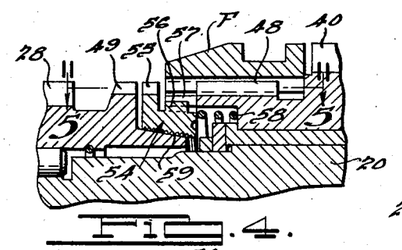
Fig. 4 is a detail enlarged view of the blocker clutch as seen in Fig. 3.

Countershaft 45 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutch sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50 thereby allowing spring 51 to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 52, 53 certain of which may be bridged or joined together. A blocker ring 54 is provided with blocking teeth 55 which either lie in the path of forward shift of teeth 52 or 53 or else between these teeth to allow clutching shift of sleeve F. Thus, blocker 54 has, at suitable locations, a drive lug 56 engaged in a slot 57 of gear 40. The blocker is urged under light energizing pressure of spring 58 into constant frictional engagement at 59 with pinion 28 so that the blocker tends to rotate with pinion 28 within the limits afforded by the travel of lug 56 circumferentially in slot 57.

Figure 5:
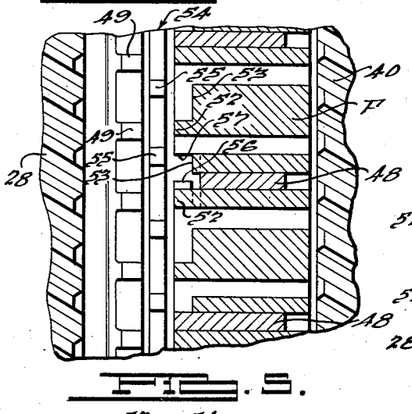
Fig. 5 is a sectional plan view illustrated as a development according to line 5—5 of Fig. 4, the automatic clutching sleeve being released.
Figure 6:
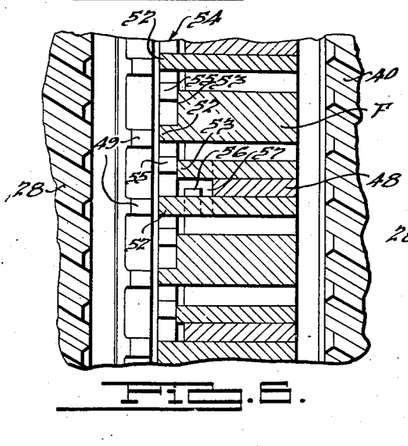
Fig. 6 is a similar view showing the automatic clutching sleeve in its intermediate shift position during the drive blocking condtion.

During drive in first and third, the speed of shaft 27 exceeds the speed of gear 40 so that, if sleeve F is fully released, the parts will be positioned as in Fig. 5 wherein the blocker teeth 55 are axially in alignment with the short teeth 53. If now the sleeve F is urged forwardly it will move to the Fig. 6 position of drive blocking and will remain in this blocked position as long as the engine drives the car in first or third.

Figure 7:
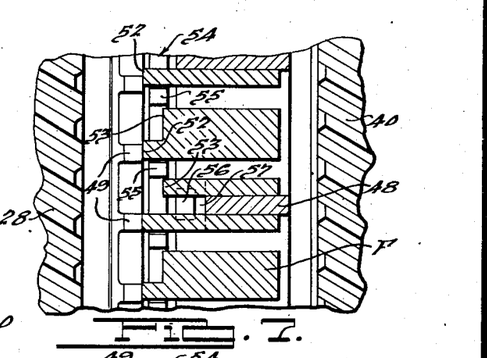
Fig. 7 is a similar view showing the automatic clutching sleeve in its coasting relationship from the Fig. 6 showing, the clutching sleeve being unblocked during coast for its clutching movement.
Figure 8:
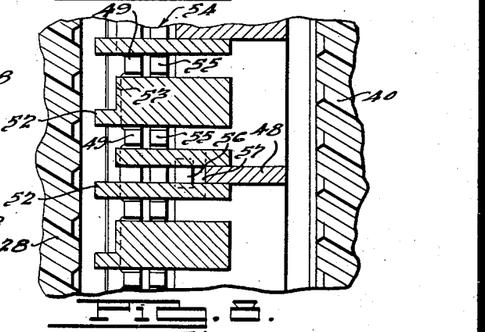
Fig. 8 is a similar view showing the automatic clutching sleeve in full clutching engagement.

If now the driver releases the accelerator pedal so that the engine may coast down under accommodation of overrunning clutch E, while sleeve F is urged forwardly, then when pinion 28 is reduced to the speed of sleeve F slight further drop in speed of pinion 28 for a fraction of a revolution below the speed of sleeve F will cause blocker 54 to rotate slightly relative to sleeve F until blocker teeth 55 strike the adjacent sides of long teeth 52 as in Fig. 7 thereby limiting further reduction in speed of the blocker relative to sleeve F. At this time the sleeve F is free to complete its forward clutching shift with teeth 49, as in Fig. 8, the blocker teeth 55 passing between adjacent long and short teeth 52, 53. With the sleeve F thus clutched during engine coast, a two-way drive is established in second or fourth depending on whether the manually shiftable sleeve F was set for first or third just prior to the clutching shift of sleeve F.

Figure 9:
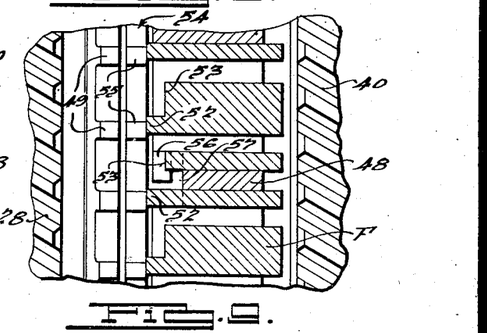
Fig. 9 is a view similar to Fig. 5 but showing the automatic clutching sleeve in its other intermediate shift position during the coast blocking condition.

In the event that sleeve F is urged forwardly from its Fig. 5 position at a time when the gear 40 is rotating faster than pinion 28, then the blocker 54 will lag behind the sleeve and will be blocked by engagement of long teeth 52 with the blocker teeth 55 as shown in Fig. 9. This is referred to as the coast blocking condition. If now the engine is speeded up by the driver depressing the accelerator pedal 50 in the usual manner, then the engine and blocker 54 rotate forwardly and blocker teeth 55 move over to the Fig. 6 drive blocking position thereby jumping the gap between teeth 52 and 53. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

Figure 10:
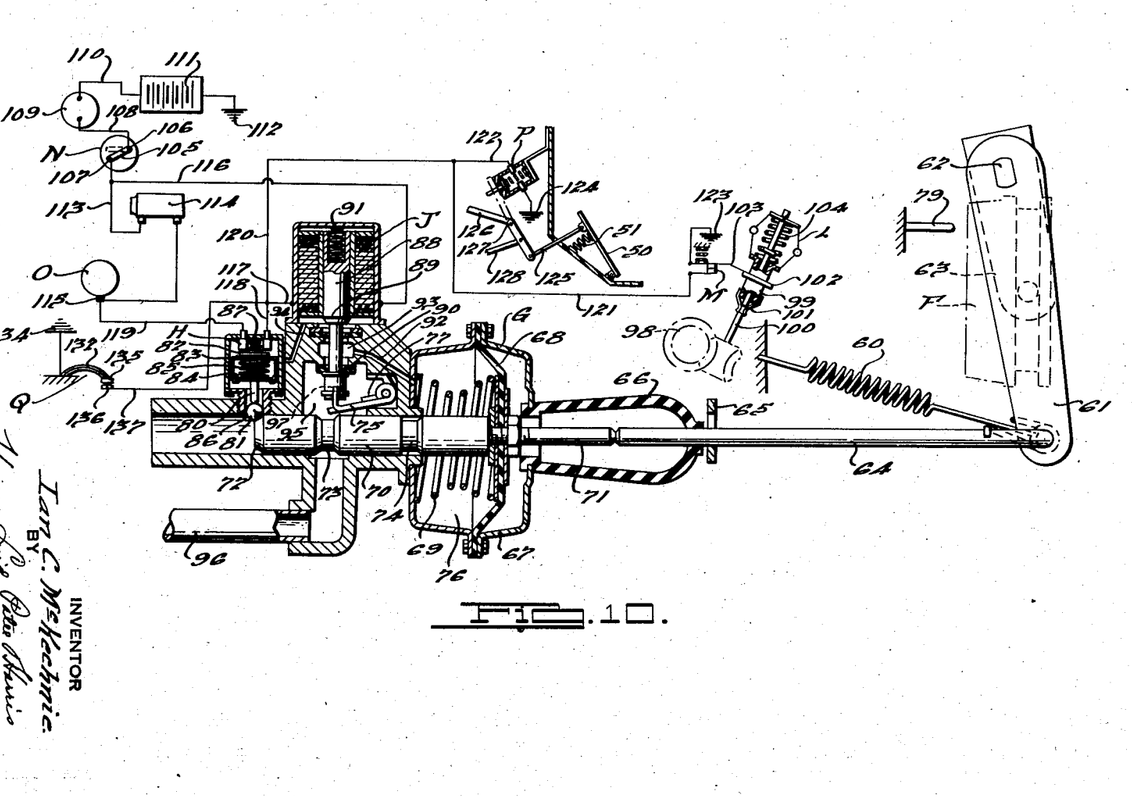
Fig. 10 is a diagrammatic view of the control mechanism for the automatic clutching sleeve, the latter being shown in its released position.
Figure 11:
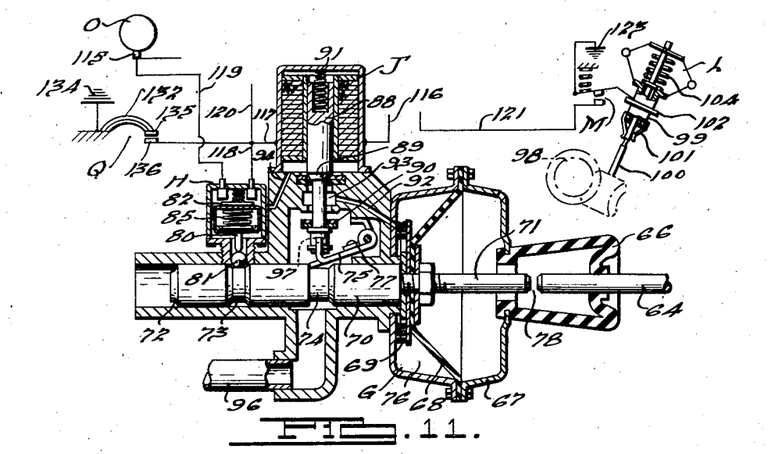
Fig. 11 is a similar view of a portion of the Fig. 10 control mechanism in another operating position.

The transmission is provided with suitable prime mover means for controlling shift of sleeve F along with several control means. Referring particularly to Figs. 10 and 11, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 60 fixed at one end and exerting a pull on lever 61 which is connected to sleeve F through the cross-shaft 62 and shifter yoke 63. Pivoted to the lower end of lever 61 is a follower rod 64 guided in a support 65 and in the rubber sealing boot 66 carried by cylinder 67 which contains the diaphragm piston 68 urged in a direction to release sleeve F by a spring 69 which is much stronger than spring 60.

Diaphragm piston 68 is connected to a reciprocatory member or leader rod 70 which has a rear extension 71 aligned with rod 64.

Rod 70 is formed with a series of detents 72, 73 and 74, the latter cooperating with a latch 75 such that when vacuum is admitted to chamber 76 to cause the piston 68 and rod 70 to assume their Fig. 11 positions, latch 75 under action of rat-trap spring 77 catches on the forward shoulder of detent 74 and holds the parts as in Fig. 11. Latch 75 thus provides a releasable holding means for the rod 70. At this time rod portion 71 moves further than rod 64 by the amount of gap 78, a stop 79 acting on lever 61 limiting forward movement of sleeve F by spring 60.

In order to provide for release of sleeve F, it is desirable to provide some means for momentarily relieving the torque load at the teeth 49 and sleeve F and in the present instance such means is provided as a system of grounding the primary terminal of the usual distributor of the ignition system whereby the engine ignition may be momentarily rendered ineffective thereby unloading the torque at sleeve F sufficiently to insure its release by spring 69. This ignition interrupting system is under control of an interrupter switch H which is closed by plunger 80 and ball 81 whenever member 70 moves from its Fig. 11 position to its Fig. 10 position by reason of the enlarged rod portion between detents 73 and 72. The switch H comprises a conductor bridge piece 82 carried by cup 83 which retains the spring seat 84 carried at the outer end of plunger 80. A spring 85 forms a yielding connection between cup 83 and seat 84 so that when ball 81 moves upwardly, the bridge piece 82 electrically connects the terminals of the switch H, the spring 85 yielding to accommodate any excess of movement of the ball beyond that required to engage the bridge piece 82 with the terminals. Ball 81 is prevented from falling inwardly beyond its position shown in Fig. 10 by reason of the in-turned seat 86 formed by peening the ball guide inwardly. A spring 87 yieldingly urges the assembly between bridge piece 82 and ball 81 inwardly to the Fig. 10 position of these parts wherein switch H is open.

When the latch 75 is released, with the parts positioned as in Fig. 11, sleeve F being clutched, the spring 69 operates to move member 70 rearwardly to close the gap 78 at the lost-motion between rod portion 71 and rod 64. This movement of rod 70 to its position establishing thrust-transmitting relationship with respect to follower rod 64 causes detent 73 to move ball 81 outwardly thereby closing switch H and grounding the ignition system. Ordinarily, when the ignition is thus interrupted, thereby relieving the thrust-application at the teeth of sleeve F, spring 69 then causes further movement of rod 70 to thrust on rod 64 and release sleeve F. During this further movement of rod 70, which is usually practically continuous with its movement closing gap 78, the detent 72 is aligned with ball 81 so that spring 87 can act to open the switch H to restore the ignition system to its normal operation.

The vacuum supply to chamber 76 is under control of solenoid J which comprises an armature plunger 88 having valving parts 89, 90. In Fig. 10 the solenoid J is energized thereby raising plunger 88 against spring 91 to seat valve 90 and shut off the vacuum supply to chamber 76 and at the same time unseat valve 89 so as to vent this chamber through passage 92, chamber 93 and vent passage 94. When the solenoid is de-energized then spring 91 lowers plunger 88 thereby seating valve 89 to shut off vent 94 and open valve 90 as in Fig. 11 thereby opening chamber 76 to the engine intake manifold K through passage 92, chambers 93 and 95, and pipe 96.

A certain lost motion is provided between plunger 88 and the inwardly bent finger 97 of latch 75 so that when the plunger moves downwardly the latch may subsequently catch at detent 74 when vacuum operates piston 68, the parts then remaining in the Fig. 11 position independently of vacuum in chamber 76 until solenoid J is energized to release the latch and vent chamber 76.

It is deemed preferable to provide a speed control on the energization of solenoid J so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 98 is a governor L of any suitable type, this governor operating a sleeve 99 outwardly along its drive shaft 100 as the car speed reaches a predetermined point, the break-away being under control of a detent 101 if desired.

The sleeve 99 has a shoulder 102 engaged by the swinging switch piece 103 of the governor switch M. When the car is stationary the detent 101 is engaged and switch M is closed. As the car accelerates the governor eventually reaches its critical speed and detent 101 releases thereby causing switch M to open. As the car slows down, the governor spring 104 restores the parts to the Fig. 10 position and by proportioning the various parts it is obvious that switch M may be made to function at desired speeds proportionate to car travel. As an example of one arrangement of governor operation and gearing arrangement, the governor may be made to open switch M during car acceleration in first and third respectively at approximately 7 and 15 M. P. H. (miles per hour), the switch M closing on stopping the car in direct and second at approximately 7 and 3 M. P. H. respectively.

The driver operated ignition switch is designated at N and comprises a conductor 105 which, in the Fig. 10 position showing the switch "on" or closed, electrically connects contacts 106 and 107. Contact 106 extends by conductor 108 to ammeter 109 and thence by conductor 110 to the usual storage battery 111 and thence to ground 112. Contact 107 has a conductor 113 extending therefrom to the engine ignition system herein shown in part as comprising coil 114 and distributor O having a primary terminal 115.

A second conductor 116 extends from contact 107 to the windings of solenoid J and thence by conductor 117, 118 to one terminal of ignition interrupter switch H, the other terminal extending by a grounding conductor 119 to the primary terminal 115 of the distributor O.

Extending from conductor 117 is a conductor 120 which branches at conductors 121 and 122, the former extending to governor switch M and thence to ground 123. Conductor 122 extends to kickdown switch P and thence through this switch to ground 124. The switch P is normally open and is closed preferably by a full depression of accelerator pedal 50 acting through link 125 and a bell crank lever 126 pivotally mounted at 127. Lever 126 actuates a link 128 which extends forwardly to adjust the engine throttle valve lever 129. When pedal 50 is thus depressed, the lever 129 is positioned to fully open the throttle valve 130 and as the throttle valve is adjusted in its wide-open range, the lever 126 closes switch P to effect a step-down in the transmission from fourth to third or from second to first by energizing the solenoid J.

The governor solenoid circuit is as follows: ground 112 to battery 111 thence by conductor 110 to ammeter 109 and by conductor 108 to ignition switch N. From switch N this circuit extends through conductor 116 and solenoid J and thence by conductors 117, 120 and 121 to switch M and ground 123.

The kickdown solenoid circuit is the same as the governor solenoid circuit to conductor 120 whence this circuit extends by conductor 122 to kickdown switch P and ground 124.

The engine ignition circuit is the same as the governor solenoid circuit up to the ignition switch N whence this circuit extends by conductor 113 to coil 114 and distributor O.

The ignition grounding circuit under control of interrupter switch H extends from the primary terminal 115 of the distributor O through conductor 119 to interrupter switch H. From switch H this grounding circuit extends through conductor 118 and thence to a suitable ground. In the illustrated arrangement this ground is provided either at 124 through conductors 120, 122 and kickdown switch P or else at 123 through conductors 120, 121 and governor switch M.

In the operation of the mechanism, the car at standstill and with the ignition switch N closed and the engine idling will cause the solenoid J to be energized as in Fig. 10 because governor switch M is closed thereby establishing the governor solenoid circuit. Cylinder 76 is vented and sleeve F disengaged as in Fig. 10. The driver shifts sleeve 42 to either the high or low range and accelerates the car ordinarily above the critical speed of governor L thereby causing switch M to open to break the governor solenoid circuit. As vacuum builds up in the engine intake manifold K, plunger 88 now being lowered by spring 91 because switch M is open, piston 68 will be operated by vacuum thereby moving member 70 to its Fig. 11 latched position, rod portion 71 moving forwardly beyond rod 64 because sleeve F is blocked against forward clutching movement with teeth 49. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired. When sleeve F thus clutches, rod 64 moves to its Fig. 11 position.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor L directs a downshift on bringing the car to rest, as soon as spring 69 overcomes the coasting torque at the teeth of sleeve F, this torque being very low as the car stops. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kickdown, above the car speed which opens switch M, switch P closes thereby energizing the kickdown solenoid circuit and causing solenoid J to raise plunger 88 and release latch 75 thereby venting chamber 76. At this time the sleeve F is under driving torque from the engine operating under wide open throttle. However, when latch 75 is released, spring 69 operates rod 70 rearwardly, sufficiently to close gap 78 thereby closing the interrupter switch H and causing the ignition grounding circuit to ground the engine ignition system. This relieves the torque at sleeve F and spring 69 ordinarily operates as aforesaid to release the sleeve whereupon the ignition is restored at detent 72 and the engine quickly speeds up to engage overrunning clutch E for establishing the third or first driving ratio depending on the setting of sleeve 42 prior to the kickdown operation.

On bringing the car to a stop when sleeve F is clutched as in fourth, for example, the governor L closes governor switch M so as to energize solenoid J, vent chamber 76 and cause release of sleeve F so that the car will be started in third, assuming the manual sleeve 42 to be left in its forward high range shift position.

The operation of the transmission mechanism as described is what may be termed the normal operation. However when the car has been left standing, as in over night parking, when the temperature is very cold such as below 10° or 15° Fahrenheit and especially around 20° F. below zero, there is a tendency for the parts to become sluggish in operation and to bind at the various joints and bearings. After the engine has been running and the car operated for about five or ten minutes, the various parts warm up from an assumed −20° F. to around 10° or 15° F. above zero and the mechanism will then function as intended. The foregoing temperatures and warm-up time are of course given to illustrate the general conditions and these figures will, of course, widely vary according to climatic conditions and the type of transmission and control parts dealt with.

Under cold starting conditions the power of the vacuum is often strong enough, after driving in first or third above the critical speed of governor switch M, to cause the piston 68 to move to its Fig. 11 position to allow the sleeve F to clutch but then on stopping the car or attempting kickdown the rod 70 tends to fail to release the sleeve F. This accommodates movement of rod 70 to take up gap 78 and ground the ignition with or without partial releasing movement of sleeve F. In either event the ignition is not restored and sometimes rod 70 sticks so that the car cannot be driven or even started. It is furthermore undesirable to allow the car to stop with the sleeve F clutched, as where it sticks under very cold conditions, because if the car is then on a hill tending to coast backwards and with sleeve 42 clutched with either teeth 43 or 44, the coast load will impose an attempted double drive through the transmission thereby preventing manual shift of sleeve 42. Then with the engine "dead" by reason of the grounded ignition, the car requires towing before the parts can be restored to proper relationship. The double drive, for example, is as follows, assuming sleeve 42 to be clutched with teeth 44 and sleeve F clutched with teeth 49. One attempted drive, when the car coasts backwards, is from shaft 20 and hub 41 through sleeve 42 to gear 40 and thence through sleeve F to pinion 28. The other attempted drive is from gear 40 to countershaft gear 37 through clutch E and gear 34 to pinion 28. As these drives are of different ratio the transmission locks-up or is subjected to what is called an undesired no-back condition.

In order to overcome the foregoing difficulties, I have provided temperature responsive means so arranged in conjunction with the transmission mechanism that it cannot improperly function under the relatively cold conditions. By preference, when the transmision embodies a manual shift as at sleeve 42 in addition to an automatic or power controlled shift as at sleeve F, I arrange the temperature control so that it will act on the automatic shift control without thereby affecting the manual shift.

In one embodiment of my invention illustrated in Figs. 10 and 11, I arrange the temperature control so that it will prevent the device G from operating under cold conditions of the mechanism, the device G being rendered operative automatically upon the mechanism warming up to a temperature which insures its proper operation. Under such conditions, after overnight cold parking, the sleeve 42 may be shifted and the car driven in first, third or reverse but sleeve F will remain in its Figs. 3 and 10 position of release until the parts have sufficiently warmed up.

Figures 12, 13, 14:
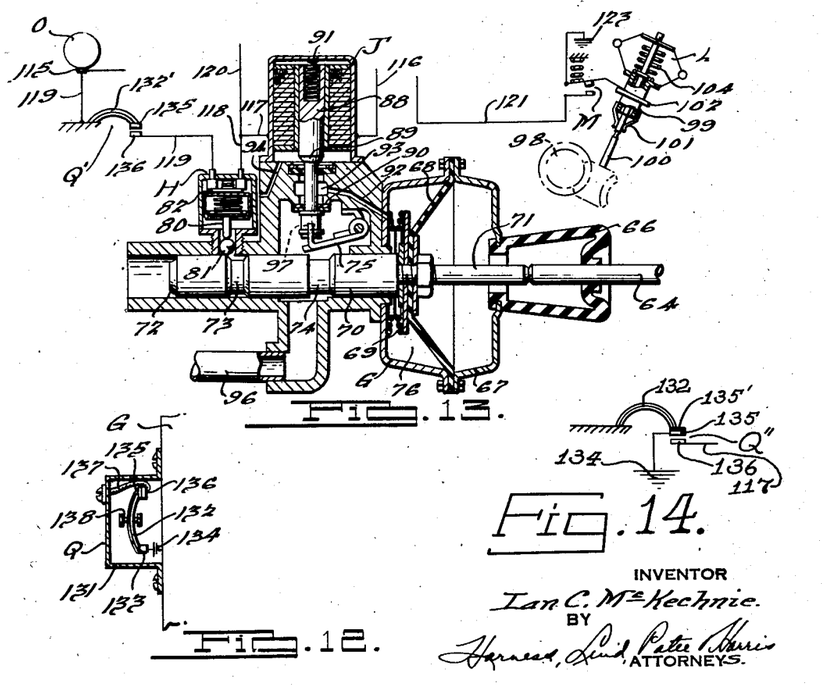
Fig. 12 is a detail sectional view showing the temperature responsive switch.
Fig. 13 is a view generally similar to Fig. 11 but illustrating a modified arrangement of thermal control for the transmission.
Fig. 14 is a diagrammatic view of a further modified arrangement of thermostatic switch control.

In another embodiment of my invention illustrated in Fig. 13, I arrange my temperature control so that, under the cold conditions aforesaid, the torque-relieving means cannot be operated. With this arrangement, when ignition grounding is employed as the torque-relieving means, the engine cannot be rendered "dead" and even if sleeve F should remain clutched on stopping, or if gap 78 should be taken up to close the interrupter switch H without attendant release of the sleeve and opening of switch H, the engine can be driven and the no-back condition overcome or the car can be started and driven with sleeve F clutched. After the parts have warmed up sufficiently then my temperature responsive means acts automatically to render the ignition interrupting means operative and the whole transmission system then operates normally.

Referring first to the Fig. 10 system, I have provided a temperature responsive switch Q, best shown in Fig. 12, so arranged that under the cold conditions it will always ground the grounding conductor 120 of solenoid J regardless of whether conductor 120 is grounded at 123 or 124.

Figures 1, 2:
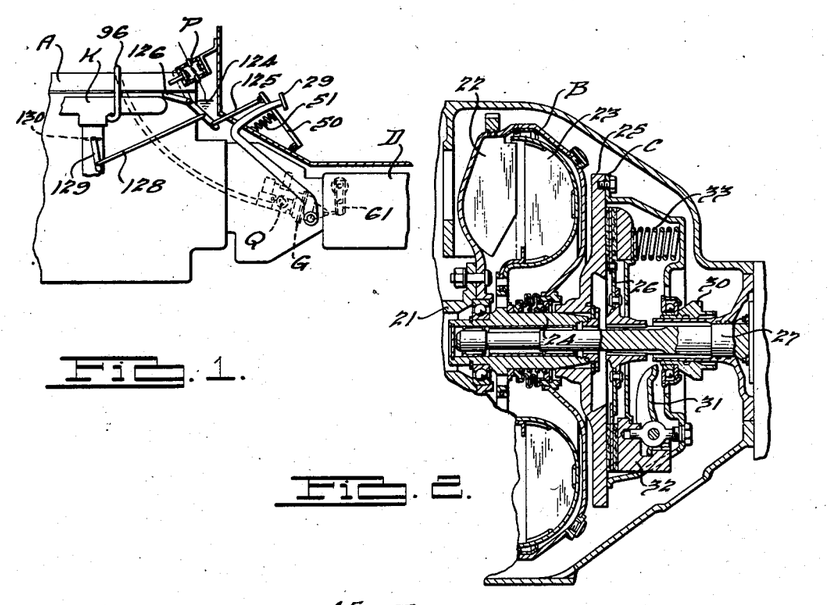
Fig. 1 is a side elevational view showing the motor vehicle engine and power transmission.
Fig. 2 is a longitudinal sectional elevational view through the main clutching mechanism.

Switch Q comprises an enclosing casing 131 which may be mounted at any location which will cause the control functions to be realized. Inasmuch as the motor G is usually the more important mechanism for consideration under the conditions dealt with, I preferably mount the switch Q on the outside wall of motor G as indicated in Figs. 1 and 12. This switch is of standard make having a bi-metal conductor element 132 fixed at one end to a support 133 suitably grounded at 134 and having its other end formed with a terminal 135 shown in Fig. 12 as contacting with a fixed terminal 136 from which a conductor 137 extends to the conductor 120. A guide 138 may be provided for the element 132.

While the temperature responsive characteristics of switch Q may widely vary according to a variety of conditions dealt with, let it be assumed that switch Q is so arranged as that it will open at 10° F. above zero and will close at temperatures below said 10° F. With such an arrangement the solenoid J will always be energized by grounding conductor 120 through switch Q whenever the temperature at the switch is below the assumed 10° F. When the car is then started, first and third speeds are available but sleeve F will remain unclutched even when switch M opens or when switch P closes. Switch Q thus maintains solenoid J energized and the transmission control parts at motor G remain in their Fig. 10 positions. However, after the engine has been running and the car driven for a short while, the motor G and switch Q rise in temperature sufficiently to cause the bi-metal switch element 132 to swing contact 135 away from contact 136 and thereby break the grounding circuit through switch Q. The transmission control system then operates normally until such time as the temperature at switch Q again falls enough to cause element 132 to move contact 135 into engagement with contact 136, as when the car is parked for a sufficient period of time. Not only will the sleeve F be maintained in its released position as long as switch Q is closed, but this switch also controls the motor G such that the interrupter switch H is rendered inoperative and the ignition system cannot be interrupted at the grounding conduit 119.

In the Fig. 13 embodiment, I interpose a temperature responsive switch Q' in the grounding conduit 119 between distributor terminal 115 and switch H. This switch Q' is generally similar to switch Q but is arranged for opposite action in that the conductor bi-metal element 132' is such that the switch Q' is open at the aforesaid low temperatures and automatically opens as the surrounding parts warm up to a temperature at which the transmission system will function normally.

When starting the car under cold conditions, switch Q' is open making it impossible to interrupt the ignition through grounding conductor 119 even though the interrupter switch H is closed and gap 78 is taken up, this being the condition illustrated in Fig. 13. This cannot give rise to the aforesaid objections because even though sleeve F does not release, the engine can still operate normally and sleeve 42 can be disengaged under the aforesaid no-back conditions because forward drive torque can be applied from the engine to sleeve 42 so as to overcome the coast torque. As soon as switch Q' closes, incident to the brief warm-up period, then the ignition interrupting means is thereby rendered operative and the transmission system will function normally.

Referring to Fig. 14 the switch point or terminal 135 is insulated at 135' from the bi-metal 132. In this arrangement the electrical current travels just as in the Fig. 11 arrangement except that the circuit goes from 117 to switch terminals 136, 135 and thence directly to ground 134 instead of going through the bi-metal 132. This has the advantage that the bi-metal is not heated by the passage of current and therefore does not influence operation of switch Q. Obviously the Fig. 14 arrangement may, if desired, be incorporated in the Fig. 13 embodiment by arranging the grounding circuit directly from conductor 119 to terminal 135 so as not to pass through the bi-metal 132'.

I claim:

1. In a motor vehicle drive having an engine; a variable speed ratio transmission comprising means operable to effect change between two driving speed ratios from the engine to the vehicle; and temperature responsive means for automatically rendering the aforesaid means selectively operative and inoperative to effect said change in response to predetermined temperature variation.

2. In a motor vehicle drive having an engine; a variable speed ratio transmission comprising a plurality of means operating respectively to control relatively different speed ratio drives between the engine and vehicle; and thermal-means for controlling operation of only one of said speed ratio control means.

3. In a motor vehicle drive having an engine; a variable speed ratio transmission comprising a plurality of means operating respectively to control relatively different speed ratio drives between the engine and vehicle; and temperature responsive means for rendering one of said speed ratio control means inoperative without thereby affecting operation of the remainder of said plurality of speed ratio control means.

4. In a motor vehicle drive having an engine; a variable speed ratio transmission comprising a plurality of means operating respectively to control relatively different speed ratio drives between the engine and vehicle; and temperature responsive means for automatically rendering one of said speed ratio control means selectively operative and inoperative in response to predetermined temperature variation without thereby affecting operation of the remainder of said plurality of speed ratio control means.

5. In a motor vehicle drive having an engine; a variable speed ratio transmission having a pair of means respectively operable to provide a pair of relatively different speed ratio drives from the engine to the vehicle; driver operable means for effecting operation of one of said pair of speed ratio drive means; power means for controlling operation of the other of said pair of speed ratio drive means; and temperature responsive means for controlling said power means.

6. In a motor vehicle drive having an engine; a variable speed ratio transmission having a pair of means respectively operable to provide a pair of relatively different speed ratio drives from the engine to the vehicle; driver operable means for effecting operation of one of said pair of speed ratio drive means; power means for controlling operation of the other of said pair of speed ratio drive means; and temperature responsive means for rendering said power means selectively inoperative and operative in response to predetermined temperature variation.

7. In a motor vehicle drive having an engine; a variable speed ratio transmission having a pair of means respectively operable to provide a pair of relatively different speed ratio drives from the engine to the vehicle; driver operable means for effecting operation of one of said pair of speed ratio drive means; power means for controlling operation of the other of said pair of speed ratio drive means; and temperature responsive means for rendering said power means inoperative without thereby affecting operation of said driver operable means.

8. In a motor vehicle drive having an engine; transmission mechanism operable to provide a drive from the engine to the vehicle; driver operable means for effecting operation of said transmission mechanism thereby to provide or release said drive; transmission mechanism operable to provide another drive from the engine to the vehicle, comprising, positively engageable drive-control elements one of which is movable into engaging relationship with the other to accommodate said other drive and into disengaging relationship with respect to said other element to release said other drive; and temperature responsive means for controlling operation of the second said transmission mechanism without thereby affecting said operation of the first said transmission mechanism by said driver operable means.

9. In a motor vehicle drive having an engine; transmission mechanism operable to provide a drive from the engine to the vehicle; driver operable means for effecting operation of said transmission mechanism thereby to provide or release said drive; transmission mechanism operable to provide another drive from the engine to the vehicle, comprising, positively engageable drive-control elements one of which is movable into engaging relationship with the other to accommodate said other drive and into disengaging relationship with respect to said other element to release said other drive; means operable to control movement of said movable element between its said positions of engaging and disengaging relationship; and temperature responsive means for controlling operation of said movement-control-means without thereby affecting said operation of the first said transmission mechanism by said driver operable means.

10. In a motor vehicle drive having an engine; transmission mechanism operable to provide a drive from the engine to the vehicle; driver operable means for effecting operation of said transmission mechanism thereby to provide or release said drive; transmission mechanism operable to provide another drive from the engine to the vehicle, comprising, positively engageable drive-control elements one of which is movable into engaging relationship with the other to accommodate said other drive and into disengaging relationship with respect to said other element to release said other drive; means operable to control movement of said movable element from its said position of disengaging relationship to its said position of engaging relationship; and temperature responsive means for controlling operation of said movement-control-means so as to selectively render the same operative and inoperative in response to predetermined temperature change without thereby affecting said operation of the first said transmission mechanism by said driver operable means.

11. In a motor vehicle drive having an engine; transmission mechanism operable to provide a drive from the engine to the vehicle, said mechanism including engageable drive-control elements one of which is movable into engaging relationship with the other to accommodate said drive and into disengaging relationship with respect to said other element to release said drive; pressure differential means operable to control movement of said movable element; and temperature responsive means for controlling operation of said pressure differential means so as to selectively render the same operative or inoperative.

12. In a motor vehicle drive having an engine; transmission mechanism operable to provide a drive from the engine to the vehicle, said mechanism including engageable drive-control elements one of which is movable into engaging relationship with the other to accommodate said drive and into disengaging relationship with respect to said other element to release said drive; means comprising a vacuum motor operable to control movement of said movable element; and temperature responsive means for controlling application of vacuum to said motor so as to selectively render said movement-control-means operative and inoperative in response to predetermined temperature change.

13. In a motor vehicle drive having an engine; transmission mechanism operable to provide a drive from the engine to the vehicle, said mechanism including engageable drive-control elements one of which is movable into engaging relationship with the other to accommodate said drive and into disengaging relationship with respect to said other element to release said drive; a pressure fluid motor operable to control movement of said movable element from its said position of disengaging relationship to its said position of engaging relationship; solenoid controlled valving means for controlling application of pressure fluid to said motor; and temperature responsive means for controlling energization of said solenoid so as to selectively render said motor operative and inoperative in response to predetermined temperature change.

14. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved, means operable upon relief of said thrust-application for effecting said relative disengagement of said elements; means for effecting relief of said thrust-application; and means operating in response to temperature ambient to said element-disengaging-means for controlling said relief-effecting-means.

15. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable upon relief of said thrust-application for effecting said relative disengagement of said elements; means for effecting relief of said thrust-application; and temperature responsive means for automatically rendering said relief-effecting-means selectively operative and inoperative to relieve said thrust-application in response to predetermined variation of temperature ambient with respect to said element-disengaging-means.

16. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; means operable upon interruption of said ignition system for effecting said relative disengagement of said elements; means for interrupting said ignition system; and means responsive to temperature ambient to said element-disengaging-means for controlling said interrupting means.

17. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; means operable upon interruption of said ignition system for effecting said relative disengagement of said elements; means for interrupting said ignition system; and temperature responsive means for automatically rendering said interrupting means selectively operable and inoperable to interrupt said ignition system in response to predetermined variation of temperature ambient with respect to said element-disengaging-means.

18. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means for effecting relief of said thrust-application; means operable to control movement of said movable element; and temperature responsive means for controlling said relief-effecting-means and said movement-control-means.

19. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; means for interrupting said ignition system; means operable to control movement of said movable control element; and temperature responsive means for automatically rendering said interrupting means and said movement-control-means selectively operative and inoperative in response to predetermined temperature variation.

20. In a motor vehicle drive having an engine; a variable speed ratio transmission comprising a plurality of means operating respectively to control relatively different speed ratio drives between the engine and vehicle; an ignition system for said engine adapted to be interrupted to facilitate operation of one of said speed ratio control means; means for interrupting said ignition system; and temperature responsive means for controlling said interrupting means so as to render said one speed ratio control means selectively operative and inoperative in response to predetermined temperature change without thereby affecting operation of the remainder of said plurality of speed ratio control means.

21. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means for effecting relief of said thrust-application; means operable to control movement of said movable element; transmission mechanism operable to provide another drive from the engine to the vehicle; driver operable means for effecting operation of the second said transmission mechanism thereby to provide or release said other drive; and temperature responsive means for controlling said relief-effecting-means and said movement-control-means in response to predetermined temperature change without thereby affecting operation of the second said transmission mechanism by said driver operable means.

22. In a motor vehicle drive having an engine provided with an ignition system adapted to be interrupted; means for grounding said ignition system thereby to interrupt said ignition system; a variable speed ratio transmission comprising means operable as an incident to interruption of said ignition system for effecting change in the speed ratio drive between the engine and vehicle; and a thermal-responsive switch for controlling said grounding means so as to selectively render the same operative or inoperative to interrupt said ignition system in response to predetermined change of temperature ambient with respect to said speed ratio change means.

23. In a motor vehicle drive having an engine; a variable speed ratio transmission comprising means operable to effect change between two driving speed ratios from the engine and vehicle; motor means including an electrically energizable device for controlling operation of said speed ratio change means; a switch adapted to be opened and closed to control energization of said electrically energizable device; and temperature responsive means for controlling energization of said electrically energizable device independently of said switch such that said motor means is rendered inoperative when the temperature of said motor means falls below a predetermined value which is less than the freezing point.

24. In a motor vehicle drive having an engine provided with a throttle; a variable speed ratio transmission comprising means operable to effect change in the speed ratio drive between the engine and vehicle; motor means including an electrically energizable device for controlling operation of said speed ratio change means; a switch adapted to be opened and closed to control energization of said electrically energizable device; temperature responsive means for controlling energization of said electrically energizable device as a function of the temperature of said motor means and independently of said switch; and means operable under control of the vehicle driver for adjusting said throttle and operating said switch.

25. In a motor vehicle drive having an engine; a variable speed ratio transmission comprising means operable to effect change in the speed ratio drive between the engine and vehicle; motor means including an electrically energizable device for controlling operation of said speed ratio change means; a switch adapted to be opened and closed to control energization of said electrically energizable device; temperature responsive means for controlling energization of said electrically energizable device as a function of the temperature of said motor means and independently of said switch; and means operable in response to predetermined vehicle driving speed for operating said switch.

26. In a motor vehicle having an engine; a variable speed ratio transmission; a motor normally operable to control said transmission to effect change in the speed ratio drive between the engine and vehicle, said motor being of a type susceptible to faulty operation after the vehicle has been parked overnight under conditions exposing said motor to atmospheric temperatures below the freezing point; means for mounting said motor so as to receive heat generated by said engine such that, when the vehicle has been subjected to the aforesaid parking conditions, susceptibility to faulty operation of said motor is overcome owing to temperature rise of said motor after the engine has been operated over a period of time; and temperature responsive means carried by the vehicle so as to be subjected to heat generated by the engine, said temperature responsive means operating automatically to render said motor inoperative when the temperature of said motor falls below a predetermined value less than the freezing point when the vehicle has been subjected to the aforesaid parking conditions, and to restore said motor for the aforesaid normal operation thereof after the engine has been operated over the aforesaid period of time.

IAN C. McKECHNIE.